United States Patent
Hermann et al.

(10) Patent No.: US 8,312,525 B2
(45) Date of Patent: *Nov. 13, 2012

(54) AUTHENTICATION OVER A NETWORK USING ONE-WAY TOKENS

(75) Inventors: Eckehard Hermann, Griesheim (DE); Dieter Hermann Kessler, Gräfenhausen (DE)

(73) Assignee: Software AG, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/106,161

(22) Filed: May 12, 2011

(65) Prior Publication Data

US 2011/0214172 A1   Sep. 1, 2011

Related U.S. Application Data

(63) Continuation of application No. 11/253,958, filed on Oct. 19, 2005, now Pat. No. 8,028,331.

(30) Foreign Application Priority Data

Oct. 22, 2004   (EP) .................................... 04025186

(51) Int. Cl.
*G06F 7/04* (2006.01)
*G06F 15/16* (2006.01)
*G06F 17/30* (2006.01)
*H04L 29/06* (2006.01)

(52) U.S. Cl. .................. 726/9; 726/7; 726/10

(58) Field of Classification Search ................ 726/5–10, 726/17–20; 713/155, 168, 172, 182, 185
See application file for complete search history.

(56) References Cited

U.S. PATENT DOCUMENTS

| | | | |
|---|---|---|---|
| 5,226,079 A | | 7/1993 | Holloway |
| 5,684,950 A | * | 11/1997 | Dare et al. ...................... 726/10 |
| 5,784,463 A | | 7/1998 | Chen et al. |

(Continued)

FOREIGN PATENT DOCUMENTS

EP   1150263   10/2001

(Continued)

OTHER PUBLICATIONS

European search report for application No. EP 04025186, mailed Jul. 14, 2005, 9 pages.

*Primary Examiner* — Philip Chea
*Assistant Examiner* — Trong Nguyen
(74) *Attorney, Agent, or Firm* — Meyertons Hood Kivlin Kowert & Goetzel, P.C.; Jeffrey C. Hood; Mark S. Williams

(57) ABSTRACT

A method for authenticating an entity at a first data resource, the method comprising the steps of: sending a first request token from the entity (100) to a token distribution unit (20) to request a first one-way authentication token, the first request token being a function of authentication information provided by the entity (100); sending the first one-way authentication token from the token distribution unit (20) to the entity (100); sending the first one-way authentication token from the entity (100) to the first data resource (200) to authenticate the entity (100) at the first data resource (200); sending the first one-way authentication token from the first data resource (200) to the token distribution unit (20) to validate the first one-way token; and invalidating the first one-way token.

20 Claims, 1 Drawing Sheet

U.S. PATENT DOCUMENTS

Figure 1:
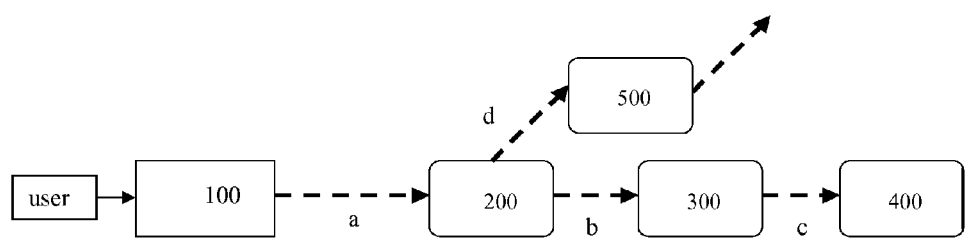

| | | |
|---|---|---|
| 6,049,877 A | 4/2000 | White |
| 6,173,400 B1 | 1/2001 | Perlman et al. |
| 6,618,806 B1 | 9/2003 | Brown et al. |
| 6,823,391 B1 | 11/2004 | Deen et al. |
| 6,898,711 B1 * | 5/2005 | Bauman et al. ............... 713/185 |
| 6,973,493 B1 | 12/2005 | Slaughter et al. |
| 7,000,118 B1 | 2/2006 | Murthy et al. |
| 2002/0034301 A1 | 3/2002 | Andersson |
| 2003/0005118 A1 * | 1/2003 | Williams ..................... 709/225 |
| 2003/0084171 A1 | 5/2003 | de Jong et al. |
| 2004/0236938 A1 * | 11/2004 | Callaghan ..................... 713/150 |
| 2005/0108575 A1 | 5/2005 | Yung |
| 2005/0193198 A1 | 9/2005 | Livowsky |
| 2006/0080545 A1 * | 4/2006 | Bagley ......................... 713/183 |

FOREIGN PATENT DOCUMENTS

| | | |
|---|---|---|
| WO | 03012714 | 2/2003 |

* cited by examiner

AUTHENTICATION OVER A NETWORK USING ONE-WAY TOKENS

1. PRIORITY DATA

This application is a continuation of, and claims benefit of priority to, U.S. application Ser. No. 11/253,958, titled "Authentication Method and Devices", filed Oct. 19, 2005 now U.S. Pat. No. 8,028,331, whose inventors were Eckehard Hermann and Dieter Hermann Kessler, which claims benefit of priority to European Patent Application Serial No. EP 04 025 186.0, titled "Authentication Method and Devices", filed Oct. 22, 2004, whose inventors were Eckehard Hermann and Dieter Hermann Kessler, both of which are incorporated by reference in their entirety as though fully and completely set forth herein.

2. TECHNICAL FIELD

The present invention relates to a method for authenticating an entity at a data resource.

3. THE PRIOR ART

Access to data resources such as data bases or applications running on a main-frame computer is typically controlled by providing an authorized user with a password. However, since data resources are nowadays more and more distributed, the authentication information, such as the user name and the password or a certificate, must be sent over sometimes unsecured channels between the client application of the user and the addressed data resource. This is particularly a problem if a user intends to access a data resource which is not directly connected the client application but only via one or more intermediate servers or the like so that the authentication information is passed on over various channels. In such a situation, the user cannot control, whether all of the sections of the communication between the client application and the addressed data resource are indeed secured.

One way of improving the security of authentication information is the use of tokens, i.e., virtual objects, passed from the client to the data resource for authentication. To obtain a token, a client sends at first authentication information to a trusted third party. If the client is authenticated, the trusted third party issues a token to the client, wherein in some systems the trusted third party also verifies the authorization of the client to access a certain data resource. By means of this token the client can access the various data resources, which may validate the token with the trusted third party. As a result it is no longer the authentication information itself, which is sent over the possibly unsecured channels, but only a token.

However, even if tokens are used, an attacker could listen to the communication between the client and one or more data resources and try to gain access by replaying bit sequences sent to the data resources, which may contain the token. Accordingly, there is still a considerable risk that the identity of a user is "hijacked" and subsequently used to gain access to various data sources of a distributed network without being authorized.

It is therefore the problem of the present invention to provide a method for authenticating an entity, such as a user or a client application, at a data resource, which overcomes the above explained disadvantages of the prior art and allows a secure access control, even if the communication between the entity and the data resources uses one or more unsecured channels.

4. SUMMARY OF THE INVENTION

According to a first aspect of the present invention, this problem is solved by a method for authenticating an entity at a first data resource, the method comprising the steps of:
    sending a first request token from the entity to a token distribution unit to request a first one-way authentication token, the first request token being a function of authentication information provided by the entity,
    sending the first one-way authentication token from the token distribution unit to the entity;
    sending the first one-way authentication token from the entity to the first data resource to authenticate the entity at the first data resource,
    sending the first one-way authentication token from the first data resource to the token distribution unit to validate the first one-way token; and
    invalidating the first one-way token.

Accordingly, instead of the single token of the prior art, there are two types of tokens: Request tokens, which are sent from the entity to the token distribution unit and one-way authentication tokens, which are received by the entity in response and which can be used for authentication of the entity at the data resource only once. After the one-way authentication token is sent from the data resource to the token distribution unit to verify that it is a correct authentication token, it is invalidated.

As a consequence, each authentication token travels from the token distribution unit to the entity, from the entity to the data resource and back to the token distribution unit. The described life-cycle is only passed once and only in the indicated direction, before the one-way authentication token is invalidated. As a consequence, a data resource receiving the same one-way authentication token for the second time, will immediately recognize that a replay attack or the like is taking place and block the access to its data. This allows to transmit the authentication token over an unsecured channel without the risk of a hijack of the identity of the origin of the authentication information.

A further advantage of the present invention is that the one-way authentication token can be made much smaller than ordinary digitally signed tokens. The authentication token may for example consist of only 16 bytes, which facilitates its integration into existing programs.

Preferably, the token distribution unit sends the first request token used in the first method step to the entity in response to the authentication information being sent to the token distribution unit from the entity. Accordingly, a client sends at first authentication information, such as a username and a password or a certificate, to the token distribution unit and receives in response a request token, which allows to obtain an authentication token for a single access of a data resource.

The security of the communication is further increased, if the one-way authentication token is valid only for a predefined limited time. By contrast, the first request token can preferably be reused by the entity to obtain further one-way authentication tokens to authenticate the entity at the first data resource again and/or at other data resources. Since the request token is in contrast to the authentication token preferably not transmitted over the unsecured channel(s) between the entity and the data resource(s), there is no risk that this token is intercepted by an attacker.

In a particularly preferred embodiment of the first aspect of the invention the method comprises sending a second request token from the token distribution unit to the first data resource in response to the validation of the first one-way authentication token; and preferably sending the second request token from the first data resource to the token distribution unit to request a second one-way authentication token;

sending the second one-way authentication token from the token distribution unit to the first data resource;

sending the second one-way authentication token from the first data source to a second data resource to authenticate the entity also at the second data resource;

sending the second one-way authentication token from the second data resource to the token distribution unit to validate the second one-way authentication token; and invalidating the second one-way authentication token.

Accordingly, the inventive concept of using one-way authentication tokens can also be extended to a situation, wherein a first data resource has to contact a second data resource to meet a request from the entity. To this end, the process is repeated, i.e. the first data resource is provided with a second request token to obtain a second authentication token, which it will then forward for authentication at a second data resource. The second data resource in turn validates the second authentication token at the token distribution unit, which leads finally to the invalidation of the second authentication. It is apparent that the described method can be cascaded so that chains of data resources of any length can be securely accessed by the method of the present invention, even if one or more of the channels linking the chained data resources are unsecured.

According to a further aspect, the present invention is directed to a token distribution unit comprising a request token issue unit issuing a first request token in response to the receiving of authentication information from an entity, an authentication token issue unit issuing a one-way authentication token in response to the receiving of the first request token from the entity, a validation unit validating the one-way authentication token for a data resource, and an invalidation unit invalidating the authentication token issued by the authentication token issue unit and received with a validation request form the data resource.

Finally, the present invention relates according to a still further aspect to a first data resource comprising an access control unit receiving a one-way authentication token to gain access to the data of the first data resource, a validation request unit sending a received one-way authentication token to a token distribution unit and obtaining a request token in response, and an authentication token obtaining unit sending the request token to the token distribution unit to obtain a one-way authentication token for a single access of the first data resource at a second data resource.

Further dependent claims relate to preferred embodiments of the method and the token distribution unit.

5. SHORT DESCRIPTION OF THE DRAWINGS

In the following detailed description presently preferred embodiments of the invention are described with reference to the drawings which show:

FIG. 1: An arrangement of a web server connected to several data resources to illustrate the problem underlying the present invention; and FIG. 2: a schematic representation of the various steps performed in a method in accordance with a preferred embodiment of the present invention.

6. DETAILED DESCRIPTION OF THE PREFERRED EMBODIMENT

FIG. 1 illustrates a typical situation as it is encountered in today's distributed networks of data resources: A web server 100 provides access for a user not only to the files of the web server 100 itself but also to several data resources either directly or indirectly connected to the web server 100. The data resources may in an exemplary configuration comprise one ore more applications 200, 500, running for example on one or more mainframe computers (not shown), and a server 300 with a data base managing program handling requests for a database 400, such as an Adabas database.

When a user at the web server 100 wants to access data at the database 400, his request is initially sent from the web server 100 to the application 200, which processes the request and sends a corresponding request to the server 300, which finally sends a request to the database 400. Whenever one of the data resources 200, 300 or 400 receives a request, it requires authentication information which enables the respective data resource to verify, whether the requesting user is authorized to access the requested data. As a result, the authentication information has in the above example to be communicated over the channels a, b and c (cf. FIG. 1).

Whereas in the past the various applications, server and databases were typically localized in one, generally secure location interconnected by secure channels, the various data resources are nowadays typically distributed over several locations and interconnected by more or less open networks such as the Internet or an Intranet. As a consequence, the channels a, b, c, d are no longer secured channels. In particular, a user entering his authentication information at the web server 100 does not know and cannot control, whether one or more of the channels a, b, c, which are used to process his request, are secured or not. Therefore, there is a considerable risk that the authentication information supplied by a user and thereby his identity may be hijacked on its way to the data server 400.

Figure 2:
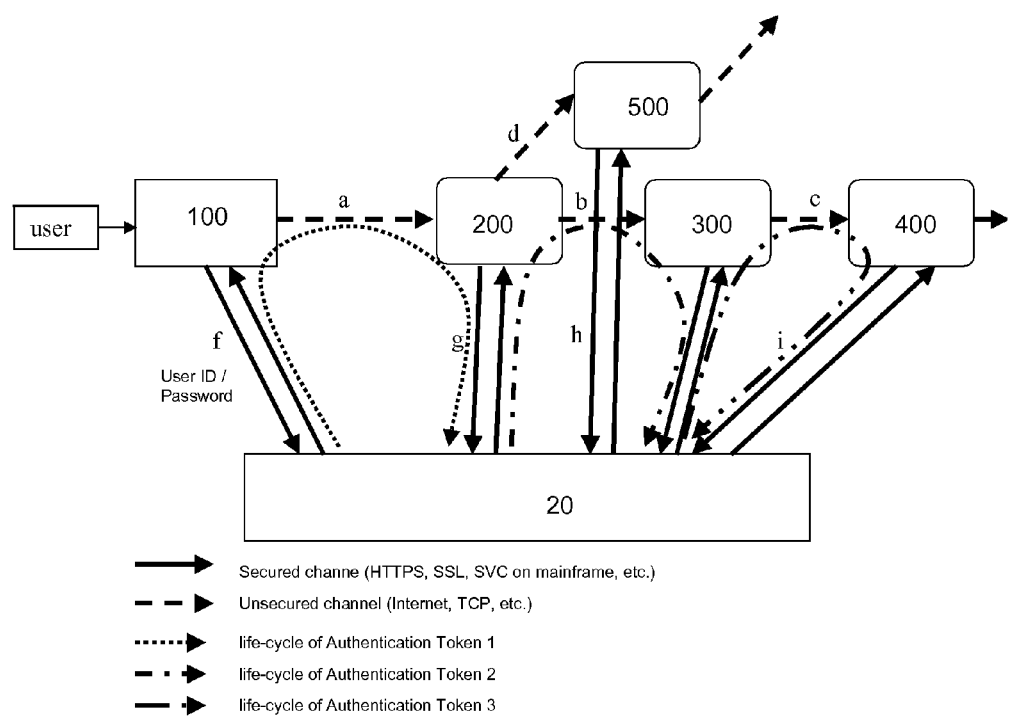

The method according to the invention improves the security for the authentication process by providing an Integrated Authentication Framework (IAF) 20 as shown in FIG. 2. In the following, the function of the IAF 20, in particular its distribution of various tokens, is described with respect to the specific network of data resources shown in FIG. 2. However, it is to be understood, that the IAF 20 and the method steps described below can also be applied to any other network of distributed data resources. Further, whereas the description refers in the following to a data request of a user at a web server 100, the method and the system of the present invention can also be used for data being sent from the web server 100 to any of the data resources 200, 300, 400 and 500 or data being simply processed at one of the data resources.

A user trying to access data at any of the data resources 200, 300, 400 or 500 enters the authentication information at the web server 100. The web server 100 forwards the authentication information of the user, typically the username and the password or a certificate, to the IAF 20. The channel f is a secured channel similar to all other channels g, h, and i, which preferably directly connect the IAF 20 to the various data resources 200, 300, 400, 500. Instead of a (human) user, the whole process may also be started by an application running on the web server 100 or an interconnected client application, which requests data from one of the data resources 200, 300, 400 or 500 of the network. In this case the authentication information sent to the IAF will be provided by the client application (not shown), for example in the form of a certificate.

When the IAF 20 receives the authentication information from the web server 100, it verifies its content and issues in response a first request token to the web server 100. The request token is a unique set of bytes, typically 16 bytes, created by the IAF 20, which enables the web server 100 to obtain from the IAF 20 one or more one-way authentication tokens, which the web server 100 can then use to access data at one of the data resources 200 or 500. Whenever the web server 100 needs a further one-way authentication token, it will again send the request token to the IAF 20, which will again respond with issuing a further one-way authentication token to the web server 100. The first authentication token for the web server 100 can alternatively be sent already together with the initial issuing of the request token to reduce data traffic from and to the IAF 20.

The exchange of the authentication information and the request token between the web server 100 and the IAF is illustrated by the two continuous arrows on the left side of FIG. 2. The path of the one-way authentication tokens used in the method illustrated by FIG. 2 is indicated by dotted or dash-dotted arrows. As can be seen, the first authentication token called "authentication token 1" is sent from the IAF 20 to the requesting web server 100. If the web server 100 needs data from the data resource 200, it will forward the authentication token 1 to the data resource 200.

In order to verify that the received one-way authentication token 1 has indeed been issued by the IAF 20, the data resource 200 will sent the one-way authentication token 1 received over the unsecured channel a back to the IAF 20 via the preferably secured channel g. The IAF 20, which preferably keeps track of all issued one-way authentication tokens, validates the correctness of the authentication token received from the data resource 200. The IAF 20 may further check, whether a predefined time limit for the validity of the authentication token 1 has already expired and, if so, instruct the data resource 200 not to allow the access to the requested data. Otherwise, i.e. if the validation is successful, the IAF 20 issues a corresponding message to the data resource 200, which then responds to the request of the web server 100.

Finally, the IAF invalidates the authentication token 1, which can then no longer be used to access any data in the network of FIG. 2. As can be seen, the authentication token 1 has a life-cycle, which starts with the issuing at the IAF 20 and which terminates with its final invalidation at the IAF 20. For any further request of data or sending of data from the web server 100 to the data resource 200 or another connected data resource 500, the web server 100 will need a further one-way authentication token. In this case, the web server 100 will send once more its request token to the IAF 20, which will respond with a further one-way authentication token.

Since any one-way authentication token of the described method will only be used once and therefore only once travel along the possibly unsecured channel a (or one of the other channels b, c, d, see below), it is of no concern if an attacker listens on one of the unsecured channels for authentication information. Even if he succeeds to somehow catch the one-way authentication token during its single path from the web server 100 to the data resource 200, he can not reuse the authentication token for any unauthorized data access. This is, since the IAF 20 will not validate a second use of the already invalidated authentication token, when it is received again from the data resource 200 for validation. Alternatively such a reused authentication token may already be rejected by the data resource 200, if it keeps track of the received one-way authentication tokens.

If the data requested by the web server 100 is not available on the data resource 200, it might be necessary that the data resource 200 contacts a further data resource, for example the server 300. This can be done as follows:

When the data resource 200 validates the authentication token 1 by sending it along the channel g to the IAF 20, it receives as a response not only a confirmation about the validity of the authentication token 1 but also a request token. This second request token—the first request token is the request token of the web server 100—can be used by the data resource 200 to obtain an a one-way authentication token, called in the following authentication token 2, for accessing the server 300. To this end, the data resource 200 sends its request token to the IAF 20, which verifies the request token and responds with the requested one-way authentication token 2. Alternatively, the IAF 20 can provide the data resource 200 with the first one-way authentication token together with sending the request token, if it is desired to reduce the data traffic on the channel g.

In a similar manner as the web server 100 uses the one-way authentication token 1 to access the data resource 200, the data resource 200 can now access the server 300, which will then validate the one-way authentication token 2 by sending it back to the IAF 20, where it is checked and finally invalidated.

As can be seen from FIG. 2, this process can be repeated to access the data base 400, so that finally the one-way authentication tokens 1, 2 and 3 are used for the overall transaction. However, since all of the three tokens are used only once, the overall request from the web server 100 to the data base 400 can be processed via one or more unsecured channels without the risk of a hijacking of authentication information and thereby the identity of a user.

When the described method is used with all data sources 200, 300, 400 and 500 participating, there will finally be a situation, wherein each data resource is provided with its respective request token. Each request token is bound to one member of the network, i.e. the web server 100 or any of the data resources 200, 300, 400 and 500. However, the request tokens may also be provided with a time limit so that they will be automatically invalidated when a predefined time has elapsed. Clearly, the time limit may be different for different participants of the network.

Finally, the request tokens may further be used by any of the participants of the network to get more information about the user. For example, if the data resource 500 needs additional information about the user in order to respond to a request from the web server 100 or to execute a certain task, it can send a command such as "getinfo(request token)" to the IAF 20. Since any request token used by the various data resources and the web server 100 is a function of the authentication information initially sent to the IAF 20 and stored by the IAF, the IAF can then provide the required information, for example the full name of a user, his address, his degree of authorization etc.

The invention claimed is:

1. A token distribution unit comprising one or more processors and one or more memories, wherein the one or more memories comprise program instructions which are executable by the one or more processors to implement:

a request token issue unit issuing a first request token to a computer system of an entity in response to receiving authentication information from the computer system of the entity, wherein the computer system of the entity, a first data resource, and a second data resource are connected to the token distribution unit over respective secured channels, wherein the computer system of the entity, the first data resource, and the second data resource are distributed over separate local or remote locations and interconnected by unsecured channels, wherein the first request token is issued over the secured channel between the computer system of the entity and the token distribution unit, and wherein the first request token is transmitted only over the secured channel between the computer system of the entity and the token distribution unit;
a one-way authentication token issue unit issuing a first one-way authentication token to the computer system of the entity in response to receiving the first request token from the computer system of the entity;
a validation unit validating the first one-way authentication token received from the first data resource; and
an invalidation unit invalidating the first one-way authentication token issued by the authentication token issue unit and received with a validation request from the first data resource, wherein the first one-way authentication token travels directly from the token distribution unit to the computer system of the entity, from the computer system of the entity to the first data resource and from the first data resource back to the token distribution unit only once and in the indicated direction, before being invalidated by the token distribution unit;
wherein the request token issue unit issues a second request token to the first data resource over the secured channel between the first data resource and the token distribution unit when the validation unit has successfully validated the first one-way authentication token for the first data resource, wherein the second request token is transmitted only over the secured channel between the first data resource and the token distribution unit, and wherein the second request token is used by the first data resource to obtain a second one-way authentication token from the authentication token issue unit for a single access of the first data resource at the second data resource.

2. The token distribution unit of claim 1, wherein the first one-way authentication token is valid only for a predefined limited time.

3. The token distribution unit of claim 1, wherein the first request token is reuseable by the computer system of the entity to obtain further one-way authentication tokens to authenticate the entity at the first data resource again and/or at other data resources.

4. The token distribution unit of claim 1, wherein the program instructions are further executable by the one or more processors to implement:
the token distribution unit receiving the second request token from the first data resource to request a second one-way authentication token;
the token distribution unit sending the second one-way authentication token to the first data resource, wherein the first data source sends the second one-way authentication token to a second data resource to authenticate the entity also at the second data resource, and wherein the second data resource sends the second one-way authentication token to the token distribution unit to validate the second one-way token; and
the invalidation unit invalidating the second one-way token.

5. The token distribution unit of claim 1, wherein the program instructions are further executable by the one or more processors to implement: the token distributing unit receiving a command including the second request token; and the token distributing unit sending information about the entity to the first data resource.

6. One or more non-transitory computer-accessible memory mediums that store program instructions executable by one or more processors to implement:
a request token issue unit issuing a first request token to a computer system of an entity in response to receiving authentication information from the computer system of the entity, wherein the computer system of the entity, a first data resource, and a second data resource are connected to the token distribution unit over respective secured channels, wherein the computer system of the entity, the first data resource, and the second data resource are distributed over separate local or remote locations and interconnected by unsecured channels, wherein the first request token is issued over the secured channel between the computer system of the entity and the token distribution unit, and wherein the first request token is transmitted only over the secured channel between the computer system of the entity and the token distribution unit;
a one-way authentication token issue unit issuing a first one-way authentication token to the computer system of the entity in response to receiving the first request token from the computer system of the entity;
a validation unit validating the first one-way authentication token received from the first data resource; and
an invalidation unit invalidating the first one-way authentication token issued by the authentication token issue unit and received with a validation request from the first data resource, wherein the first one-way authentication token travels directly from the token distribution unit to the computer system of the entity, from the computer system of the entity to the first data resource, and from the first data resource back to the token distribution unit only once and in the indicated direction, before being invalidated by the token distribution unit;
wherein the request token issue unit issues a second request token to the first data resource over the secured channel between the first data resource and the token distribution unit when the validation unit has successfully validated the first one-way authentication token for the first data resource, wherein the second request token is transmitted only over the secured channel between the first data resource and the token distribution unit, and wherein the second request token is used by the first data resource to obtain a second one-way authentication token from the authentication token issue unit for a single access of the first data resource at the second data resource.

7. The one or more non-transitory computer-accessible memory mediums of claim 6, wherein the first one-way authentication token is valid only for a predefined limited time.

8. The one or more non-transitory computer-accessible memory mediums of claim 6, wherein the first request token is re-useable by the computer system of the entity to obtain further one-way authentication tokens to authenticate the entity at the first data resource again and/or at other data resources.

9. The one or more non-transitory computer-accessible memory mediums of claim 6, wherein the program instructions are further executable by the one or more processors to implement: the token distribution unit receiving the second request token from the first data resource to request a second one-way authentication token; the token distribution unit sending the second one-way authentication token to the first data resource; the first data source sending the second one-way authentication token to a second data resource to authenticate the entity also at the second data resource; the second data resource sending the second one-way authentication token to the token distribution unit to validate the second one-way authentication token; and the invalidation unit invalidating the second one-way authentication token.

10. The one or more non-transitory computer-accessible memory mediums of claim 6, wherein the program instructions are further executable by the one or more processors to implement: the token distributing unit receiving a command including the second request token; and the token distributing unit sending information about the entity to the first data resource.

11. One or more non-transitory computer-accessible memory mediums that store program instructions executable by one or more processors to implement:
  issuing a first request token to a computer system of an entity in response to receiving authentication information from the computer system of the entity, wherein the computer system of the entity, a first data resource, and a second data resource are connected to the one or more processors over respective secured channels, wherein the computer system of the entity, the first data resource, and the second data resource are distributed over separate local or remote locations and interconnected by unsecured channels, wherein the first request token is issued over the secured channel between the computer system of the entity and the one or more processors, and wherein the first request token is transmitted only over the secured channel between the computer system of the entity and the one or more processors;
  issuing a first one-way authentication token to the computer system of the entity in response to receiving the first request token from the computer system of the entity;
  validating the first one-way authentication token received from the first data resource; and
  invalidating the first one-way authentication token received with a validation request from the first data resource, wherein the first one-way authentication token travels directly from the one or more processors to the computer system of the entity, from the computer system of the entity to the first data resource, and from the first data resource back to the one or more processors only once and in the indicated direction, before being invalidated by the one or more processors;
  issuing a second request token to the first data resource over the secured channel between the first data resource and the one or more processors when the validation unit has successfully validated the first one-way authentication token for the first data resource, wherein the second request token is transmitted only over the secured channel between the first data resource and the one or more processors, and wherein the second request token is used by the first data resource to obtain a second one-way authentication token from the one or more processors for a single access of the first data resource at the second data resource.

12. A first data resource comprising one or more processors and one or more memory mediums, wherein the one or more memory mediums comprise program instructions which are executable by the one or more processors to implement:
  an access control unit receiving a first one-way authentication token from a computer system of an entity to gain access to data of the first data resource, wherein the computer system of the entity, the first data resource, and a second data resource are connected to a token distribution unit over respective secured channels, wherein the computer system of the entity, the first data resource, and the second data resource are distributed over separate local or remote locations and interconnected by unsecured channels, and wherein the first one-way authentication token is received from the computer system of the entity over the unsecured channel between the computer system of the entity and the first data resource;
  a validation request unit sending the received first one-way authentication token to the token distribution unit and obtaining a request token in response to successful validation of the first one-way authentication token by the token distribution unit, wherein the request token is transmitted only over the secured channel between the first data resource and the token distribution unit; and
  a one-way authentication token obtaining unit sending the request token to the token distribution unit over the secured channel between the first data resource and the token distribution unit to obtain a second one-way authentication token for a single access of the first data resource at the second data resource, wherein the second one-way authentication token for a single access of the first data resource at the second data resource travels directly from the token distribution unit to the first data resource, from the first data resource to the second data resource, and from the second data resource back to the token distribution unit only once and in the indicated direction before being invalidated by the token distribution unit.

13. The first data resource of claim 12, wherein the first one-way authentication token is valid only for a predefined limited time.

14. The first data resource of claim 12, wherein a request token is reuseable by the computer system of the entity to obtain further one-way authentication tokens to authenticate the entity at the first data resource again and/or at other data resources.

15. The first data resource of claim 12, wherein the program instructions are further executable by the one or more processors to implement: the first data resource receiving information about the entity from the token distributing unit in response to the token distributing unit receiving a command including the request token.

16. One or more non-transitory computer-accessible memory mediums that store program instructions executable by one or more processors to implement:
  an access control unit receiving a first one-way authentication token from a computer system of an entity to gain access to data of a first data resource, wherein the computer system of the entity, the first data resource, and a second data resource are connected to a token distribution unit over respective secured channels, wherein the computer system of the entity, the first data resource, and the second data resource are distributed over separate local or remote locations and interconnected by unsecured channels, and wherein the first one-way authentication token is received from the computer system of the entity over the unsecured channel between the computer system of the entity and the first data resource;
  a validation request unit sending the received first one-way authentication token to the token distribution unit and obtaining a request token in response to successful validation of the first one-way authentication token by the token distribution unit, wherein the request token is transmitted only over the secured channel between the first data resource and the token distribution unit; and
  a one-way authentication token obtaining unit sending the request token to the token distribution unit over the secured channel between the first data resource and the token distribution unit to obtain a second one-way authentication token for a single access of the first data resource at the second data resource, wherein the second one-way authentication token for a single access of the first data resource at the second data resource travels directly from the token distribution unit to the first data resource, from the first data resource to the second data resource, and from the second data resource back to the token distribution unit only once and in the indicated direction before being invalidated by the token distribution unit.

17. The one or more non-transitory computer-accessible memory mediums of claim 16, wherein the first one-way authentication token is valid only for a predefined limited time.

18. The one or more non-transitory computer-accessible memory mediums of claim 16, wherein a request token is re-useable by the computer system of the entity to obtain further one-way authentication tokens to authenticate the entity at the first data resource again and/or at other data resources.

19. The one or more non-transitory computer-accessible memory mediums of claim 16, wherein the program instructions are further executable by the one or more processors to implement: the first data resource receiving information about the entity from the token distributing unit in response to the token distributing unit receiving a command including the request token.

20. One or more non-transitory computer-accessible memory mediums that store program instructions executable by one or more processors of a first data resource to implement:

receiving a first one-way authentication token from a computer system of an entity to gain access to data of the first data resource, wherein the computer system of the entity, the first data resource, and a second data resource are connected to a token distribution unit over respective secured channels, wherein the computer system of the entity, the first data resource, and the second data resource are distributed over separate local or remote locations and interconnected by unsecured channels, and wherein the first one-way authentication token is received over the unsecured channel between the computer system of the entity and the first data resource;

sending the received first one-way authentication token to the token distribution unit and obtaining a request token in response to successful validation of the first one-way authentication token by the token distribution unit, wherein the request token is transmitted only over the secured channel between the first data resource and the token distribution unit; and sending the request token to the token distribution unit over the secured channel between the first data resource and the token distribution unit to obtain a second one-way authentication token for a single access of the first data resource at the second data resource, wherein the second one-way authentication token for a single access of the first data resource at the second data resource travels directly from the token distribution unit to the first data resource, from the first data resource to the second data resource, and from the second data resource back to the token distribution unit only once and in the indicated direction before being invalidated by the token distribution unit.

* * * * *